US010240009B2

(12) United States Patent
Clark et al.

(10) Patent No.: US 10,240,009 B2
(45) Date of Patent: Mar. 26, 2019

(54) COMPOSITES OF POLYETHYLENE AND POLYLACTIC ACID

(71) Applicant: FINA TECHNOLOGY, INC., Houston, TX (US)

(72) Inventors: Jason Clark, Houston, TX (US); John Ashbaugh, Houston, TX (US); Fengkui Li, Houston, TX (US); David Rauscher, Longview, TX (US); William Gauthier, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/635,820

(22) Filed: Mar. 2, 2015

(65) Prior Publication Data

US 2016/0257792 A1    Sep. 8, 2016

(51) Int. Cl.
B32B 1/08       (2006.01)
C08J 5/00       (2006.01)
B32B 27/32      (2006.01)
C08L 23/06      (2006.01)
B29C 47/00      (2006.01)
B29K 23/00      (2006.01)
B29K 33/00      (2006.01)
B29L 23/00      (2006.01)
B29K 67/00      (2006.01)

(52) U.S. Cl.
CPC ............... C08J 5/00 (2013.01); B32B 27/32 (2013.01); C08L 23/06 (2013.01); B29C 47/0004 (2013.01); B29C 47/0023 (2013.01); B29C 47/0054 (2013.01); B29K 2023/065 (2013.01); B29K 2033/00 (2013.01); B29K 2067/046 (2013.01); B29L 2023/22 (2013.01); C08J 2323/06 (2013.01); C08J 2423/08 (2013.01); C08J 2467/04 (2013.01); C08L 2203/18 (2013.01)

(58) Field of Classification Search
CPC .. B32B 1/02; B32B 1/08; B32B 27/32; Y10T 428/1352; C08J 2467/04; C08L 2203/18; B29C 47/0054; B29K 2067/046
See application file for complete search history.

(56) References Cited

U.S. PATENT DOCUMENTS 2,758,987 A    8/1956  Salzberg
5,310,865 A    5/1994  Enomoto et al.
6,174,971 B1   1/2001  Chen et al.
(Continued)

FOREIGN PATENT DOCUMENTS

EP        2055737 A1 *   5/2009
WO   WO-2010120673 A1 * 10/2010

OTHER PUBLICATIONS

Balakrishnan, et al., "Mechanical, Thermal, and Morphological Properties of Polylactic Acid/Linear Low Density Polyethylene Blends", Journal of Elastomers and Plastics, vol. 42, May 2010, pp. 223-239.

(Continued)

Primary Examiner — Marc A Patterson
(74) Attorney, Agent, or Firm — Albert Shung

(57) ABSTRACT

A composite may include polylactic acid, polyethylene, and optionally a compatibilizer. The composite may be formed by combining the polylactic acid with the polyethylene. The composite may be formed into an extruded article.

23 Claims, 2 Drawing Sheets

(56) References Cited

U.S. PATENT DOCUMENTS

| | | |
|---|---|---|
| 6,734,134 B1 | 5/2004 | Gray et al. |
| 8,110,644 B2 * | 2/2012 | Coffy ............... C08F 10/00 526/124.3 |
| 8,459,283 B2 | 6/2013 | Belloir et al. |
| 8,528,580 B2 | 9/2013 | Belloir et al. |
| 8,627,840 B2 | 1/2014 | Belloir et al. |
| 2007/0197716 A1 * | 8/2007 | Krishnaswamy ..... C08F 210/16 524/543 |
| 2009/0246433 A1 | 10/2009 | Michie et al. |
| 2009/0326152 A1 | 12/2009 | Li et al. |
| 2010/0143623 A1 * | 6/2010 | Hiruma ............... C08J 5/18 428/35.1 |
| 2010/0221561 A1 | 9/2010 | Sherman et al. |
| 2010/0291334 A1 * | 11/2010 | Cann ............... C08F 10/00 428/36.9 |
| 2011/0003129 A1 * | 1/2011 | Mandare ............ B32B 27/32 428/220 |
| 2011/0118417 A1 * | 5/2011 | Liu ............... C08F 10/00 525/240 |
| 2012/0329920 A1 * | 12/2012 | Sato ............... C08K 5/5205 524/100 |

OTHER PUBLICATIONS

International Search Report and Written Opinion issued in PCT/US2015/018344, dated Jun. 2, 2015, 10 pages.

Ferdinand R.W.P. Wild, et al., "ansa-Metallocene Derivatives: VII. Synthesis and Crystal Structure of a Chiral ansa-Zirconocene Derivative with Ethylene-Bridged Tetrahydroindenyl Ligands", Journal of Organometallic Chemistry, vol. 288, Issue 1, Jun. 11, 1985, pp. 63-67.

Yi-Jun Sun, et al., "Melt free-radical grafting of glycidyl methacrylate onto polypropylene", Die Angew. Makromol. Chem, 1995, V229 pp. 1-13.

Rahul M. Rasal et al., "Poly (lactic acid) modifications", Progress in Polymer Science 35 (2010) 338-356.

* cited by examiner

COMPOSITES OF POLYETHYLENE AND POLYLACTIC ACID

FIELD

This disclosure generally relates to composites of polyethylene and polylactic acid, methods of forming the composites, and articles formed from the composites.

BACKGROUND

Articles constructed from certain polyethylene resins have widespread utility, but may remain semi-permanently in a natural environment. Certain biodegradable polymers may be used in conjunction with these polyethylene resins to form composites or articles that may degrade more rapidly than composites or articles made solely with polyethylene resins.

SUMMARY

One or more embodiments relate to an extruded article. The extruded article may include a composite. The composite may include polylactic acid and polyethylene.

One or more embodiments relate to a method. The method may include forming a composite. Forming the composite may include combining polylactic acid with polyethylene. The polyethylene may be chromium catalyzed polyethylene. The method may include forming an extruded article from the composite.

BRIEF DESCRIPTION OF THE DRAWINGS

The present disclosure may be understood from the following detailed description when read with the accompanying figures.

DETAILED DESCRIPTION

Introduction and Definitions

Figure 1:
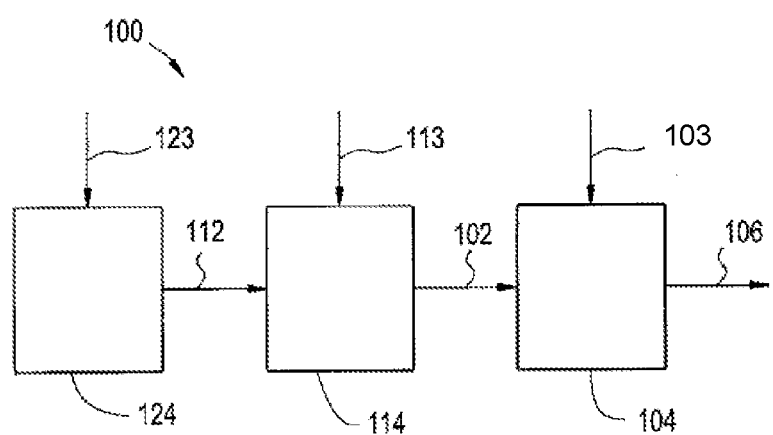
FIG. 1 depicts PENT for polyethylene resins and composites.

The following disclosure includes specific embodiments, versions and examples, but the disclosure is not limited to these embodiments, versions or examples, which are included to enable a person having ordinary skill in the art to make and use embodiments when the information in this disclosure is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" and "specific gravity" are measured via ASTM-D-792.

As used herein, "melt flow index" is measured via ASTM-D-1238-01 (Method A—Cut and Weigh).

As used herein, "Environmental Stress Crack Resistance (ESCR) for resin" is measured via ASTM-D-1693, Condition C.

As used herein, "Pennsylvania Notch Test (PENT)" is measured via ASTM-F-1473, at 80° C. and 2.4 MPa.

As used herein, "tensile strength, yield" is measured via ASTM-D-638.

As used herein, "elongation at break" is measured via ASTM-D-638.

As used herein, "tensile modulus" is measured via ASTM-D-638.

As used herein, "Izod Impact, Notched" is measured via ASTM-D-256.

As used herein, "flexural modulus" is measured via ASTM-D-790, and may be referred to as "stiffness".

As used herein, the term "equivalent" refers to a molar ratio of two components.

As used herein, "molecular weight distribution" is the ratio of the weight average molecular weight to the number average molecular weight ($M_w/M_n$) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "bimodal" refers to a polymer resin having a distinct low molecular weight portion and a distinct high molecular weight portion.

As used herein, "unimodal" refers to a polymer having a single distinct molecular weight portion.

As used herein, "copolymer" refers to any polymeric material comprising two or more different monomers.

Piping

Embodiments of the present disclosure are directed to articles such as piping.

In embodiments of the present disclosure, the composite or article of the present disclosure is prepared from a bimodal or multimodal polyethylene resin. The bimodal or multimodal polyethylene resin may be manufactured by two or more catalyst systems in a single reactor or by a single catalyst system in two or more serially connected reactors.

In embodiments of the present disclosure, the composite or article of the present disclosure is prepared from a unimodal polyethylene resin. The unimodal polyethylene resin may be manufactured by a single catalyst system in a single reactor.

The polyethylene resin may be manufactured using Ziegler-Natta catalyst, metallocene catalyst, chromium catalyst, or combinations thereof.

Metallocene Catalyst Systems

In certain embodiments, when the one or more catalyst systems are metallocene catalyst systems, they include a bridged bis-indenyl or bistetrahydro-indenyl catalyst component described by general formula:

$$R''(Ind)_2\ MQ_2$$

wherein Ind is a substituted or unsubstituted indenyl or tetrahydroindenyl group, R" is a structural bridge imparting stereorigidity to the complex, M is a metal Group 4 of the Periodic Table and Q is a hydrocarbyl having from 1 to 20 carbon atom or a halogen. The process of manufacturing polyethylene resins in accordance with these embodiments may be found, in non-limiting examples, in U.S. Pat. Nos. 8,459,283; 8,528,580; and 8,627,840, which are incorporated herein fully by reference.

If Ind is an indenyl group, the indenyl group may be unsubstituted, or the indenyl group may be substituted at position 4 with a bulky substituent and at position 2 with a small substituent. A bulky substituent is at least as bulky as a t-butyl group. A small substituent may be, but is not limited to a methyl group.

If Ind is a tetrahydroindenyl group, in some embodiments it may be unsubstituted.

In some embodiments, M may be Ti or Zr.

In some embodiments, Q is selected from aryl, alkyl, alkenyl, alkylaryl or arylalkyl groups having at most 6 carbon atoms, or a halogen. In certain embodiments, both Qs are the same and are chlorine.

In some embodiments, bridge R" may be a $C_1$-$C_4$ alkylene radical, a dialkyl germanium or silicon or siloxane, or an alkyl phosphine or amine radical, wherein the bridge is substituted or unsubstituted. In certain embodiments, bridge R" is ethylene, isopropylidene, dimethylsilyl or diphenyl.

In one embodiment, the catalyst component is ethylene bistetrahydroindenyl zirconium dichloride. The metallocene catalyst component used in the present disclosure may be prepared by any known method, including, but not limited to, the preparation method as described in J. Organomet. Chem. 288., 63-67 (1985) (incorporated herein by reference).

The catalyst system may include an activating agent having an ionizing action and may include an inert support. In certain embodiments, the activating agent may be an aluminoxane or boron-containing compound. The inert support may be a mineral oxide, such as silica. The activating agent may be a fluorinated activating support.

Metallocene-Catalyzed Polyethylene

Examples of polyethylene made in the presence of a metallocene catalyst suitable for for use in one or more embodiments of this disclosure include 6450 HDPE, mPE ER 2283, 1020 FN 24, and FINATHENE LL 4010 FE 18, each available from Total Petrochemicals USA, Inc.

Ziegler Natta Catalyst Systems

Ziegler-Natta catalyst systems may be formed from the combination of a metal component (e.g., a catalyst precursor) with one or more additional components, such as a catalyst support, a cocatalyst and/or one or more electron donors.

In one or more embodiments, the polyethylene of the present disclosure is formed in the presence of a Ziegler-Natta catalyst that includes a metal component generally represented by the formula:

wherein M is a transition metal, $R^A$ is a halogen, an alkoxy or a hydrocarboxyl group and x is the valence of the transition metal. For example, x may be from 1 to 4. An example of this embodiment is described in U.S. Pat. No. 8,110,644, which is incorporated fully by reference.

The transition metal may be selected from Groups IV through VIB (e.g., titanium, vanadium or chromium), for example. $R^A$ may be selected from chlorine, bromine, carbonates, esters, or alkoxy groups in one or more embodiments. Non-limiting examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

A catalyst may be "activated" before it is useful for promoting polymerization. Activation may be accomplished by contacting the catalyst with a Ziegler-Natta activator (Z-N activator), which is also referred to in some instances as a "cocatalyst." Non-limiting examples of such Z-N activators include organoaluminum compounds, such as trimethyl aluminum (TMA), triethyl aluminum (TEAl), tri-n-octylaluminum (TNOAl), and triisobutyl aluminum (TIBAl), for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Prior efforts to form the Ziegler-Natta catalyst generally included the methods described below. (See, U.S. Pat. Nos. 6,734,134 and 6,174,971, which are incorporated fully by reference herein.)

Ziegler-Nana-Catalyzed Polyethylene

An example of a polyethylene made in the presence of a Zeigler-Natta catalyst in an embodiment of this disclosure is XT10N, a bimodal polyethylene polymer manufactured by Total Petrochemicals and Refining USA Inc.

Chromium Catalyst Systems

In one or more embodiments, the polyethylene of the present disclosure may be catalyzed in the presence of a chromium catalyst. In one or more embodiments, the chromium catalyst may be a chromium oxide catalyst. The term "chromium catalyst" refers to a catalyst obtained by deposition of chromium oxide on a support, e.g. a silica or aluminum support. Illustrative examples of chromium catalysts include, but are not limited to, $CrSiO_2$ or $CrAl_2O_3$.

Chromium Catalyzed Polyethylene

An example of a polyethylene made in the presence of a chromium catalyst, in accordance with one or more embodiments of this disclosure, is HP401N, a unimodal high density polyethylene (HDPE) made by Total Petrochemicals and Refining USA Inc.

Polyethylene Resin

In one or more embodiments, the polyethylene may have a density ranging from about 0.86 g/cc to about 0.98 g/cc, or from about 0.88 g/cc to about 0.965 g/cc, or from about 0.90 g/cc to about 0.965 g/cc, or from about 0.925 g/cc to about 0.97 g/cc, or from about 0.930 g/cc to about 0.960 g/cc, or from about 0.940 g/cc to about 0.950 g/cc, or from about 0.942 g/cc to about 0.948 g/cc, or from about 0.944 g/cc to about 0.946 g/cc, for example.

In one or more embodiments, the polyethylene may have a melt flow index ranging from about 0.01 to about 100.0 g/10 min., or from about 0.05 to about 1.5 g/10 min., or from about 0.08 to about 1.0 g/10 min. or from about 5 to 10 g/10 min or about 8 g/10 min, as measured in accordance with ASTM-D-1238, at 190° C. and a load of 2.16 kg.

In one or more embodiments, the polyethylene may have a PENT of less than about 300 hours, or ranging from about 100 to about less than 300 hours, as measured in accordance with ASTM-F-1473.

In one or more embodiments, the polyethylene may have a tensile strength, at yield, of greater than about 3500 psi, or greater than about 3300 psi, or from about 3000 psi to about 4000 psi, as measured in accordance with ASTM-D-638, Type IV Specimen, at 2 in/min.

In one or more embodiments, the polyethylene may have a tensile modulus of less than about 940 MPa, or from about 900 to about 930 MPa, as measured in accordance with ASTM-D-638.

In one or more embodiments, the polyethylene may have an elongation, at break, of greater than about 800 percent, or ranging from about 800 to about 900 percent, or from about 825 to about 875 percent, as measured in accordance with ASTM-D-638, Type IV Specimen, at 2 in/min.

In one or more embodiments, the polyethylene may have an Izod impact, notched, ranging from about 2.0 to about 20 ft-lb/in, or from about 5.0 to about 15.0 ft-lb/in, or from about 8.0 to about 12.0 ft-lb/in, as measured in accordance with ASTM-D-256, with a ⅛ inch thick specimen.

In one or more embodiments, the polyethylene may be a homopolymer. The polyethylene homopolymer contains up to 5% of another alpha-olefin, including but not limited to $C_3$-$C_8$ alpha-olefins, such as ethylene and 1-butene. Despite the potential presence of small amounts of other alpha-olefins, the polyethylene is generally referred to as a polyethylene homopolymer.

In one or more embodiments, the polyethylene is a copolymer. When the polyethylene is a copolymer, the comonomer content of the polyethylene may be less than about 50 weight percent, or less than about 40 weight percent, or less than about 30 weight percent, or less than about 20 weight percent, or less than about 15 weight percent, or less than about 10 weight percent of the polyethylene, for example. When the polyethylene is a copolymer, the comonomer content of the polyethylene may be greater than about 2 weight percent, or greater than about 4 weight percent, or greater than about 6 weight percent, or greater than about 8 weight percent of the polyethylene, for example. The comonomers may include $C_3$-$C_8$ alpha-olefins other than ethylene.

In one or more embodiments, the polyethylene is a linear low density polyethylene, a high density polyethylene, a low density polyethylene, or a medium density polyethylene.

In certain embodiments, the polyethylene resin is a bimodal or multimodal resin. The polyethylene resin may include a HMW, low density fraction and a LMW, high density fraction.

Biodegradable Polymers

Biodegradable polymers suitable for use in one or more embodiments the present disclosure may include polylactic acid.

Polylactic acid suitable for use in this disclosure may be of the type known in the art. For example, polylactic acid may include poly-L-lactide (PLLA), poly-D-lactide (PDLA), poly-LD-lactide (PDLLA), or combinations thereof. Modified polylactic acid is also suitable for use in this disclosure. Modified polylactic acid refers to stereocomplex polylactic acid and surface-modified polylactic acid, as described in Rahul M. Rasal et al., Poly (lactic acid) modifications, Progress in Polymer Science 35 (2010) 338-356, which is incorporated herein fully by reference. Surface-modified polylactic acid includes, but is not limited to, coated polylactic acid, polylactic acid with entrapped biomacromolecules, polylactic acid blended with migratory additives, chemically conjugated polylactic acid, and polylactic acid that has been photografted. Polylactic acid may be prepared using any suitable method known to one of ordinary skill in the art. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimmer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index of from 5 g/10 min. to 35 g/10 min. or alternatively from 15 g/10 min. to 30 g/10 min., as determined in accordance with ASTM D1238 at a temperature of 210° C. and a load of 2.16 kg; a crystalline melt temperature of from 150° C. to 180° C. or alternatively from 155° C. to 170° C.; a glass transition temperature of from 45° C. to 85° C., alternatively from 50° C. to 80° C., or alternatively from 55° C. to 60° C. as determined in accordance with ASTM D3417; a tensile yield strength of from 4,000 psi to 25,000 psi, alternatively from 5,000 psi to 20,000 psi, or alternatively from 8,000 psi to 10,000 psi as determined in accordance with ASTM D638; a tensile elongation of from 1.5% to 10%, alternatively from 2% to 8%, or alternatively of from 3% to 4% as determined in accordance with ASTM D638; a notched Izod impact of from less than 2 ft-lb/in, or between, 0.1 ft-lb/in to 0.8 ft-lb/in or from 0.2 ft-lb/in to 0.7 ft-lb/in, as determined in accordance with ASTM D256, and a DSC at first melt of between 150° C. and 170° C. or between 160° C. and 170° C. or between 169° C. and 170° C. Examples of polylactic acid suitable for use in this disclosure include without limitation PLA3251, PLA 4042, PLA 4060, PLA4202, and PLA6202, which are commercially available from Nature Works LLC.

Composite

One or more embodiments relate to a composite and a method of making the composite. The composite may include polylactic acid and polyethylene.

The method of forming the composite may include combining the polylactic acid with the polyethylene. In one or more embodiments, the combining of the polylactic acid with the polyethylene may include blending the polylactic acid with the polyethylene. Blending the polylactic acid with the polyethylene may form a homogenous or heterogeneous mixture of the polylactic acid and polyethylene. In one or more embodiments, the combining of the polylactic acid with the polyethylene may include melt blending the polylactic acid with the polyethylene, coextruding the polylactic acid with the polyethylene, or combinations thereof.

In one or more embodiments, the polyethylene may be present in the composite in an amount ranging from about 80 weight percent to about 98 weight percent, based on a total weight of the composite. The polyethylene may be present in the composite in an amount of at least 85 weight percent, or at least 90 weight percent, or at least 92 weight percent, or at least 95 weight percent, for example. In other embodiments, the polyethylene may be present in amounts of about 87.5%, 94%, or 95%.

In one or more embodiments, the polylactic acid may be present in the composite in an amount ranging from about 1 weight percent to about 20 weight percent, based on a total weight of the composite. The polylactic acid may be present in the composite in an amount of at least 2.5 weight percent, or at least 5 weight percent, or at least 10 weight percent, for example.

In one or more embodiments, the composite may exhibit a PENT that is greater than the PENT of the polyethylene prior to being combined with the polylactic acid. For example, the PENT of the polyethylene, prior to being combined with the polylactic acid, may be lower than the PENT of the composite. In one or more embodiments, the composite may exhibit a PENT that is at least about 10 percent, or at least about 15 percent, or at least about 25 percent, or at least about 35 percent, or at least about 50 percent greater than the PENT of the polyethylene prior to being combined with the polylactic acid. Many polyethylenes, not blended with polylactic acid, will ultimately fail in a brittle manner by slow crack growth at 80° C. if stress is below 2.4 MPa, exhibiting a PENT of at most about 300 hours. The PENT of the composite may be greater than 300 hours, or greater than 350 hours, or greater than 400 hours, for example. The PENT of the composite may range from about greater 300 hours to about 500 hours, for example.

In one or more embodiments, the composite may exhibit a tensile modulus that is greater than a tensile modulus of the polyethylene prior to being combined with the polylactic acid. For example, the tensile modulus of the polyethylene, prior to being combined with the polylactic acid, may be lower than the tensile modulus of the composite. In one or more embodiments, the composite may exhibit a tensile modulus that is at least about 2 percent, or at least about 5 percent, or at least about 10 percent, or at least about 15 percent, or at least about 20 percent greater than a tensile modulus of the polyethylene prior to being combined with the polylactic acid. The tensile modulus of the composite may be greater than 940 MPa, greater than 960 MPa, greater than 980 MPa, or greater than 1020 MPa. In one or more embodiments, the composite may exhibit a tensile modulus ranging from about 940 to about 1020 MPa.

In one or more embodiments, the composite may include a compatibilizer. In certain embodiments, the compatibilizer is maleic anhydride-modified polyolefin, styrene-ethylene/butylene-styrene (SEBS), an epoxy-modified polyolefin, or a combination thereof. In some embodiments, the only compatibilizer in the composite is a maleic anhydride-modified polyolefin, epoxy-modified polyolefin, SEBS or a combination thereof. Non-limiting examples of epoxy-modified polyolefins include, but are not limited to, epoxy-functionalized polypropylene, epoxy-functionalized polyethylene, epoxy-functionalized polybutadiene and combinations thereof.

An example of an epoxy-functionalized polyethylene suitable for use in this disclosure includes an ethylene-methacrylate copolymer, such as polyethylene co-glycidyl methacrylate (PE-co-GMA), such as LOTADER AX8840, which is a PE-co-GMA containing 8% GMA that is commercially available from Arkema. Another example of a compatibilizer suitable for use in this disclosure is POLYBOND 3200, which has 2.7% maleic anhydride commercially available from Chemtura. An example of an epoxy-functionalized polypropylene is glycidyl methacrylate grafted polypropylene (PP-g-GMA).

In certain embodiments when the compatibilizer is PP-g-GMA, the PP-g-GMA may be prepared by any suitable method such as for example by grafting GMA onto polypropylene in the presence of an initiator such as peroxide. Examples of initiators suitable for use in this disclosure include without limitation LUPERSOL 101 and TRIGANOX 301, which are peroxides commercially available from Arkema. In an embodiment, the initiator may be used in an amount of from 0.03% to 2 wt. % by total weight of the composite, alternatively from 0.2 wt. % to 0.8 wt. %, alternatively from 0.3 wt. % to 0.5 wt. %.

The grafting reaction of GMA onto PP may be conducted in a molten state inside an extruder such as, for example, a single extruder or a twin-screw extruder. Hereinafter, such process is referred to as reactive extrusion. A feedstock including PP, GMA, and initiator (i.e., peroxide) may be fed into an extruder reactor sequentially along the extruder, alternatively the feedstock (i.e., PP, GMA, and initiator) may be pre-mixed outside and fed into the extruder.

In an alternative embodiment, the PP-g-GMA is prepared by grafting GMA onto polypropylene in the presence of an initiator and a modifier. The modifier may be a multi-functional acrylate comonomer, styrene, divinylbenzene, and combinations thereof, for example. The multi-functional acrylate comonomers may be polyethylene glycol diacrylate, trimethylolpropane triacrylate (TMPTA), alkoxylated hexanediol diacrylatete, and combinations thereof, for example.

The multi-functional acrylate comonomer may be further characterized by a high flash point. The flash point of a material is the lowest temperature at which it may form an ignitable mixture in air, as determined in accordance with ASTM D93. The higher the flash point, the less flammable the material, which is a beneficial attribute for melt reactive extrusion. In an embodiment, the multi-functional acrylate comonomer may have a flash point of from 50° C. to 120° C., alternatively of from 70° C. to 100° C., alternatively of from 80° C. to 100° C. Examples of multi-functional acrylate comonomers suitable for use in this disclosure include without limitation SR256 (polyethylene glycol diacrylate), CD560 (alkoxylated hexanediol diacrylate), and SR351 (TMPTA), which are commercially available from Sartomer.

The grafting reaction of GMA onto polypropylene in the presence of a peroxide and the multi-functional acrylate comonomer polyethylene glycol diacrylate is depicted in Scheme 1

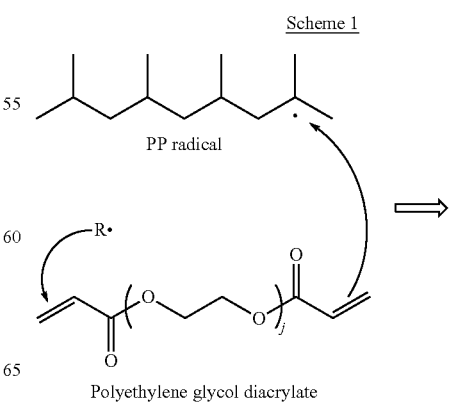

Scheme 1

PP radical

Polyethylene glycol diacrylate

-continued

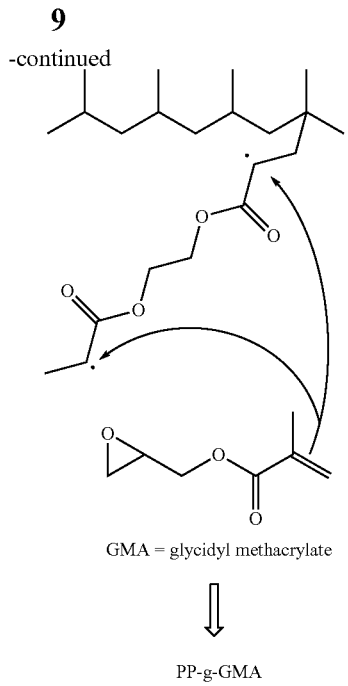

GMA = glycidyl methacrylate

⇓

PP-g-GMA

Without wishing to be limited by theory, the hydrogens on the tertiary carbon of polypropylene molecules may be easily abstracted in the presence of peroxide during reactive extrusion, forming polypropylene macroradicals with unpaired electrons. The polypropylene macroradicals which are generally unstable, tend to form free radicals through a step referred to as "β-scission." β-scission refers to a family of reactions wherein bonds that are in a beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e. the addition of the GMA) resulting in both a lower grafting of GMA and a polypropylene having a lower average molecular weight. However, in the reactions including a multi-functional acrylate comonomer, the multi-functional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

In addition, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals. Consequently, PP-g-GMA prepared using a reaction mixture including a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HGGMA).

In an embodiment, the HGGMA is prepared from a reaction mixture including a polypropylene present in an amount of from 80 wt. % to 99.5 wt. %, alternatively from 90 wt. % to 99 wt. %, or alternatively from 95 wt. % to 99 wt. %; GMA present in an amount of from 0.5 wt. % to 20 wt. %, alternatively from 1.0 wt. % to 10 wt. %, or alternatively from 1.0 wt. % to 5.0 wt. %; a multi-functional acrylate comonomer present in an amount of from 0.5 wt. % to 15 wt. %, alternatively from 1.0 wt. % to 10 wt. %, or alternatively from 1.0 wt. % to 5.0 wt. %; and an initiator present in an amount of from 0.05 wt. % to 1.5 wt. %, alternatively from 0.2 wt. % to 0.8 wt. %, or alternatively from 0.3 wt. % to 0.5 wt. %. The ratio of GMA:multi-functional acrylate comonomer in the HGGMA may range from 1:5 to 10:1, alternatively from 1:2 to 5:1, or alternatively from 1:1 to 3:1.

The amount of grafting of GMA onto the polyolefin may vary depending on a variety of factors such as the type of materials used and processing conditions. Such parameters may be varied by one of ordinary skill in the art with the benefits of this disclosure to produce reactive modifiers having a user-desired grafting yield.

The grafting yield may be determined using any suitable method. For example, the grafting yield may be determined by Fourier Transform Infrared Spectroscopy (FTIR) spectroscopy. In an embodiment, a method for determining the grafting yield includes obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13 which is incorporated by reference herein in its entirety. In an embodiment, the HGGMA may have a grafting yield of from 0.2 wt. % to 15 wt. %, alternatively from 0.5 wt. % to 10 wt. %, or alternatively from 1.0 wt. % to 5.0 wt. %.

Other examples of compatibilizers are epoxy-modified polyolefins that are reacted with with the composite. As used herein, the term "reactive modifier" refers to polymeric additives that, when added to the molten composite, form compounds in situ that serve to stabilize the composite. The compounds formed in situ compatibilize the composite and the reactive modifiers are precursors to these compatibilizers.

In one or more embodiments, the reactive modifier is selected from oxazoline-grafted polyolefins, maleated polyolefin-based ionomers, isocyanate (NCO)-functionalized polyolefins and combinations thereof, for example. The oxazoline-grafted polyolefin is a polyolefin grafted with an oxazoline ring-containing monomer. In one or more embodiments, the oxazoline may include a 2-oxazoline, such as 2-vinyl-2-oxazoline (e.g., 2-isopropenyl-2-oxazoline), 2-fatty-alkyl-2-oxazoline (e.g., those obtainable from the ethanolamide of oleic acid, linoleic acid, palmitoleic acid, gadoleic acid, erucic acid and/or arachidonic acid) and combinations thereof, for example. In yet another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof, for example. The oxazoline-grafted polyolefin may include from about 0.1 wt. % to about 10 wt. % or from 0.2 wt. % to about 2 wt. % oxazoline, for example.

The isocyanate (NCO)-functionalized polyolefins may include a polyolefin grafted with an isocyanate functional monomer. The isocyanate may be selected from TMI® unsaturated isocyanate (meta), meta and para-isopropenylalpha, alpha-dimethylbenzyl isocyanate, meta-isopropenyl-alpha, alpha-dimethylbenzyl isocyanate, para-isopropenyl-alpha, alpha-dimethylbenzyl isocyanate and combinations thereof, for example.

The maleated polyolefin-based ionomers may include a polyolefin ionomer maleated and then neutralized with a metal component. Maleation is a type of grafting wherein maleic anhydride, acrylic acid derivatives or combinations thereof are grafted onto the backbone chain of a graftable polymer. The metal component may be selected from sodium hydroxide, calcium oxide, sodium carbonate, sodium hydrogencarbonate, sodium methoxide, sodium acetate, magnesium ethoxide, zinc acetate, diethylzine, aluminium butoxide, zirconium butoxide and combinations thereof, for example. In one specific embodiment, the metal component is selected from sodium hydroxide, zinc acetate and combinations thereof, for example.

In one or more embodiments, the graftable polymer is a polyolefin selected from polypropylene, polyethylene, combinations thereof and copolymers thereof.

In certain embodiments, the reactive modifiers may be formed by a grafting reaction. The grafting reaction may occur in a molten state inside of an extruder, for example (e.g., "reactive extrusion"). Such grafting reaction may occur by feeding a feedstock sequentially along the extruder or the feedstock may be pre-mixed and then fed into the extruder, for example.

In one or more embodiments, the reactive modifiers are formed by grafting in the presence of an initiator, such as peroxide. Examples of initiators may include LUPERSOL® 101 and TRIGANOX® 301, commercially available from Arkema, Inc., for example.

The initiator may be used in an amount of from about 0.01 wt. % to about 2 wt. % or from about 0.2 wt. % to about 0.8 wt. % or from about 0.3 wt. % to about 0.5 wt. % based on the total weight of the reactive modifier, for example.

Alternatively, the reactive modifiers may be formed by grafting in the presence of an initiator, such as those described above, and a modifier selected from multi-functional acrylate comonomers, styrene, divinylbenzene, triacrylate esters and combinations thereof, for example. The multi-functional acrylate comonomer may be selected from polyethylene glycol diacrylate, trimethylolpropane triacrylate (TMPTA), alkoxylated hexanediol diacrylate, and combinations thereof, for example. The triacrylate esters may include trimethylopropane triacrylate esters, for example. It has unexpectedly been observed that the modifiers described herein are capable of improving grafting compared to processes absent such comonomers.

In one or more embodiments, the reactive modifier may include from about 80 wt. % to about 99.5 wt. %, or from about 90 wt. % to about 99 wt. % or from about 95 wt. % to about 99 wt. % polyolefin based on the total weight of the reactive modifier, for example.

In one or more embodiments, the reactive modifier may include from about 0.5 wt. % to about 20 wt. %, or from about 1 wt. % to about 10 wt. % or from about 1 wt. % to about 5 wt. % grafting component (i.e., the oxazoline, isocyanate, maleic anhydride, acrylic acid derivative) based on the total weight of the reactive modifier, for example.

In one or more embodiments, the reactive modifier may include from about 0.5 wt. % to about 15 wt. %, or from about 1 wt. % to about 10 wt. % or from about 1 wt. % to about 5 wt. % modifier based on the total weight of the reactive modifier, for example.

The ratio of grafting component to modifier may vary from about 1:5 to about 10:1, or from about 1:2 to about 5:1 or from about 1:1 to about 3:1, for example.

In one or more embodiments, the reactive modifier may exhibit a grafting yield of from about 0.2 wt. % to about 20 wt. %, or from about 0.5 wt. % to about 10 wt. % or from about 1 wt. % to about 5 wt. %, for example. The grafting yield may be determined by Fourier Transform Infrared Spectroscopy (FTIR) spectroscopy.

The composite may include from about 0.5 wt. % to about 20 wt. %, or from about 1 wt. % to about 10 wt. % or from about 3 wt. % to about 5 wt. % reactive modifier based on the total weight of the biodegradable polymeric composition, for example In one or more embodiments, the compatibilizer is an ethylene acrylate terpolymer. For example, in one or more embodiments, the compatibilizer may be LOTADER®, available from Arkema of Colombes, France.

The compatibilizer may be present in the composite in an amount ranging from about 1 weight percent to about 5 weight percent, or from about 1 to about 2.5 weight percent, or from about 2.5 to about 5 weight percent, based on a total weight of the composite.

In embodiments that include the compatibilizer, the method may include forming the composite by combining the polylactic acid, polyethylene, and compatibilizer. In one or more embodiments, the combining of the polylactic acid, polyethylene, and compatibilizer may include blending the polylactic acid, polyethylene, and compatibilizer. Blending the polylactic acid, polyethylene, and compatibilizer may form a homogenous or heterogeneous mixture of the polylactic acid, polyethylene, and compatibilizer. In one or more embodiments, the combining may include melt blending the polylactic acid, polyethylene, and compatibilizer, or coextrusion of the polylactic acid, polyethylene, and compatibilizer, or combinations thereof.

In certain embodiments, the composite includes only the polyethylene, the polylactic acid and the compatibilizer. In certain embodiments, the compatibilizer is only an ethylene acrylate terpolymer.

In one or more embodiments, the composite with the compatibilizer may exhibit a PENT that is greater than the PENT of the composite without the compatibilizer. For example, in one or more embodiments, the composite with the compatibilizer may exhibit a PENT that is at least about 10 percent, or at least about 15 percent, or at least about 25 percent, or at least about 35 percent, or at least about 50 percent greater than the PENT of the composite without the compatibilizer.

In one or more embodiments, the composite with the compatibilizer may exhibit an ESCR that is increased over an ESCR exhibited by the composite without the compatibilizer. For example, in one or more embodiments, the composite with the compatibilizer may exhibit an ESCR that is at least about 10 percent, or at least about 15 percent, or at least about 25 percent, or at least about 35 percent, or at least about 50 percent greater than the ESCR of the composite without the compatibilizer.

In one or more embodiments, the composite, with or without the compatibilizer, may exhibit an ESCR that is increased over an ESCR exhibited by the polyethylene, i.e. neat polyethylene. For example, in one or more embodiments, the composite, with or without the compatibilizer, may exhibit an ESCR that is at least about 10 percent, or at least about 15 percent, or at least about 25 percent, or at least about 35 percent, or at least about 50 percent greater than the ESCR of the polyethylene.

Product Application

The composite may be formed into articles. In one or more embodiments, forming the composite into articles may include extruding the composite to form an extruded article. In one or more embodiments, the article may be a pipe, tubing, geomembrane, or pond liner, for example.

In one or more embodiments, forming the extruded articled from the composite may include extrusion blow molding the composite. For example, and without limitation, the composite may be extrusion blow molded to form a container.

EXAMPLE

The disclosure having been generally described, the following examples show particular embodiments of the disclosure. It is understood that the example is given by way of illustration and is not intended to limit the specification or the claims. All compositions percentages given in the examples are by weight.

Polylactic acid was added to HP401N, a unimodal, chromium catalyzed HDPE made by Total Petrochemicals and Refining USA Inc, and detailed in Table 1, below.

TABLE 1

| Typical Properties of HDPE HP401N | |
|---|---|
| Density | 0.945 g/cc |
| Melt Flow | 8.0 g/10 min |
| PENT | ~100 hours |
| Tensile Strength, Yield | ~3300 psi |
| Elongation at Break | >800% |
| Flexural Modulus | 125 ksi |
| Izod Impact, Notched | 11.00 ft-lb/in |

In some samples, a compatibilizer, LOTADER®, available from Arkema of Colombes, France, was added to the composite.

Sample 1 is a control sample that includes HP401N that is not combined with polylactic acid, and is not combined with a compatibilizer. Sample 2 is a composite of HP401N and polylactic acid. Sample 2 includes 95 weight percent of HP401N and 5 weight percent of polylactic acid. Sample 3 is a composite of HP401N and polylactic acid. Sample 3 includes 90 weight percent of HP401N and 10 weight percent of polylactic acid. Sample 4 is a composite of HP401N, polylactic acid, and a compatibilizer (LOTADER®). Sample 4 includes 94 weight percent of HP401N, 5 weight percent of polylactic acid, and 1 weight percent LOTADER®. Sample 5 is a composite of HP401N, polylactic acid, and a compatibilizer (LOTADER®). Sample 5 includes 87.5 weight percent of HP401N, 10 weight percent of polylactic acid, and 2.5 weight percent LOTADER®. The components of the composites in Samples 2, 3, 4, and 5 were combined by melt blending.

The PENT results for each of Samples 1, 2, 3, 4 and 5 are shown in FIG. 1. The results in FIG. 1 demonstrate that the addition of polylactic acid to HP401N increased the time to failure in the PENT test for the composite, in comparison to the time to failure in the PENT test for the HP401N without the polylactic acid. Sample 1, without polylactic acid or compatibilizer, has a lower time to failure in the PENT test than Samples 2-5. Also, the results in FIG. 1 demonstrate that the addition of the compatibilizer to the composite further increased the time to failure in the PENT test. For example, Sample 4 includes 5 weight percent polylactic acid and 1 weight percent compatibilizer, and has a higher time to failure in the PENT test than Sample 2, which also includes 5 weight percent polylactic acid, but does not include compatibilizer.

Figure 2:
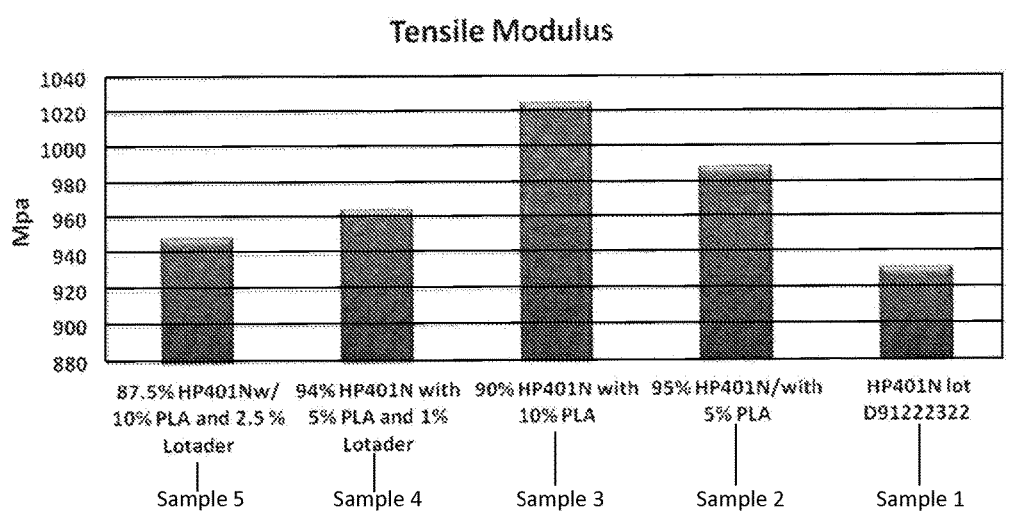
FIG. 2 depicts tensile modulus for polyethylene resins and composites.

FIG. 2 shows tensile modulus results for each of Samples 1, 2, 3, 4 and 5. The results shown in FIG. 2 demonstrate that the addition of polylactic acid to HP401N increased the tensile modulus for the composite, in comparison to the tensile modulus for the HP401N without the polylactic acid. Sample 1, without polylactic acid or compatibilizer, has a lower tensile modulus than Samples 2-5. Also, the results in FIG. 2 demonstrate that the addition of the LOTADER®, a rubbery, low modulus component, to the composite did not increase the tensile modulus of the composite. For example, Sample 4 includes 5 weight percent polylactic acid and 1 weight percent compatibilizer, and has a lower tensile modulus than Sample 2, which also includes 5 weight percent polylactic acid, but does not include compatibilizer. Other, higher modulus compatibilizers may be used in place of or in addition to LOTADER®, if desired.

While the foregoing is directed to embodiments of the present disclosure, other and further embodiments of the disclosure may be devised without departing from the basic scope thereof and the scope thereof is determined by the claims that follow.

What is claimed:

1. Piping comprising:
a composite of polylactic acid and polyethylene, wherein the polyethylene has a tensile strength at yield of from about 3000 psi to 4000 psi, as measured by ASTM-D-638, Type IV Specimen, a tensile modulus of less than about 940 MPa, as measured in accordance with ASTM-D-638, an Izod impact, notched, ranging from about 2.0 to about 20 ft-lb/in, as measured in accordance with ASTM-D-256, and a PENT of less than about 300 hours, as measured by ASTM-F-1473, wherein the composite exhibits a PENT, measured in accordance with ASTM-F-1473, that is at least about 10 percent greater than a PENT of the polyethylene without the polylactic acid.

2. The piping of claim 1, wherein the composite exhibits a PENT, measured in accordance with ASTM-F-1473, of greater than about 300 hours.

3. The piping of claim 1, wherein the composite exhibits the tensile modulus, determined in accordance with ASTM D638, that is at least about 2 percent greater than the tensile modulus of the polyethylene.

4. The piping of claim 1, wherein the composite exhibits a tensile modulus of greater than 940 MPa, determined in accordance with ASTM D638.

5. The piping of claim 1, wherein the extruded article is an extruded pipe.

6. The piping of claim 1, wherein the composite further comprises a compatibilizer.

7. The extruded article of claim 6, wherein the compatibilizer is a functionalized polyolefin.

8. The extruded article of claim 7, wherein the functionalized polyolefin contains maleic anhydride groups or epoxide groups.

9. The piping of claim 6, wherein the compatibilizer is an ethylene acrylate terpolymer.

10. The piping of claim 6, wherein the compatibilizer is present in the composite in an amount ranging from about 1 weight percent to about 5 weight percent, based on a total weight of the composite.

11. The piping of claim 1, wherein the polyethylene is present in the composite in an amount ranging from about 80 weight percent to about 98 weight percent, based on a total weight of the composite.

12. The piping of claim 1, wherein the polylactic acid is present in the composite in an amount ranging from about 1 weight percent to about 20 weight percent, based on a total weight of the composite.

13. The piping of claim 1, wherein the polyethylene is a a metallocene catalyzed polyethylene, or a Ziegler-Natta catalyzed polyethylene.

14. The piping of claim 1, wherein the composite exhibits an increased ESCR over the polyethylene.

15. The piping of claim 8, wherein the compatibilizer is polyethylene co-glycidyl methacrylate or glycidyl methacrylate grafted polypropylene.

16. The piping of claim 6, wherein the compabilitizer is formed in-situ from a reactive modifier.

17. The piping of claim 16, wherein the reactive modifier is an oxazoline-grafted polyolefin, maleated polyolefin-based ionomers, isocyanate (NCO)-functionalized polyolefins or a combination thereof.

18. The piping of claim 17, wherein the reactive modifier is a polyolefin grafted with a 2-vinyl-2-oxazoline, 2-fatty-alkyl-2-oxazoline, ricinoloxazoline maleinate, undecyl-2-oxazoline, soya-2-oxazoline, ricinus-2-oxazoline, 2-isopropenyl-2-oxazoline, 2-isopropenyl-4,4-dimethyl-2-oxazoline or combinations thereof.

19. The piping of claim 18, wherein the reactive modifier comprises between about 0.1 wt. % to about 10 wt. % oxazoline.

20. The piping of claim 17, wherein the reactive modifier is a polyolefin grafted with an isocyanate functional monomer.

21. The piping of claim 17, wherein the reactive modifier is a polyolefin ionomer maleated and then neutralized with a metal component.

22. The piping of claim 16, wherein the reactive modifier includes from about 95 wt. % to about 99 wt. % polyolefin based on the total weight of the reactive modifier.

23. The piping of claim 16, wherein the composite consists of the polyethylene, polylactic acid, and the compatibilizer.

\* \* \* \* \*